United States Patent
Struye et al.

[11] Patent Number: 5,998,802
[45] Date of Patent: Dec. 7, 1999

[54] METHOD FOR OBTAINING AN ELECTRICAL REPRESENTATION OF A RADIATION IMAGE USING CCD SENSORS

[75] Inventors: Luc Struye, Mortsel; Paul Leblans, Kontich; Peter Willems, Stekene, all of Belgium

[73] Assignee: Agfa-Gevaert, Mortsel, Belgium

[21] Appl. No.: 09/015,116

[22] Filed: Jan. 29, 1998

Related U.S. Application Data

[60] Provisional application No. 60/041,292, Mar. 18, 1997.

[30] Foreign Application Priority Data

Jan. 31, 1997 [EP] European Pat. Off. .............. 97200267

[51] Int. Cl.$^6$ ...................................................... G03B 42/02
[52] U.S. Cl. ............................ 250/584; 250/585; 250/586
[58] Field of Search ................................... 250/581, 582, 250/583, 584, 585, 586, 587, 483.1, 484.4; 385/120

[56] References Cited

U.S. PATENT DOCUMENTS

| | | |
|---|---|---|
| 4,455,369 | 6/1984 | Purro ........................................ 430/357 |
| 4,933,558 | 6/1990 | Carter et al. . |
| 4,953,038 | 8/1990 | Schiebel . |
| 5,266,803 | 11/1993 | Heffelfinger .............................. 250/582 |
| 5,796,113 | 8/1998 | Nagli et al. ........................... 250/483.1 |

FOREIGN PATENT DOCUMENTS

| | | |
|---|---|---|
| 0559118 | 1/1993 | European Pat. Off. . |
| WO96/41212 | 12/1996 | WIPO . |

*Primary Examiner*—Constantine Hannaher
*Assistant Examiner*—Albert Gagliardi
*Attorney, Agent, or Firm*—Baker & Botts, L.L.P.

[57] ABSTRACT

A method of obtaining an electrical representation of a radiation image by means of at least one CCD sensor. A stimulable phosphor plate, the area of which is divided into at least two different portions, is exposed to a radiation image. Each of the portions is stimulated by light guided from a light source, the light having a wavelength within the stimulating wavelength range of the phosphor on the plate and causing the phosphor plate to emit stimulated light. The stimulated light from each phosphor plate portion is guided to at least one two-dimensional CCD sensor kept in a static position relative to the phosphor plate portion, such that the CCD detects the stimulated light. The detected stimulated light is converted into an electrical representation of the plate portion, and the electrical representation of each of the different plate portions is combined to form an electrical representation of the radiation image. When using fiber optics a high readout efficiency can be obtained using a broad range of light sources in continuous or pulsed mode.

13 Claims, 2 Drawing Sheets

METHOD FOR OBTAINING AN ELECTRICAL REPRESENTATION OF A RADIATION IMAGE USING CCD SENSORS

The application claims the benefit of the U.S. Provisional Application No. 60/041,292, filed Mar. 18, 1997.

FIELD OF THE INVENTION

The present invention is in the field of digital radiography and more specifically relates to a method for obtaining an electrical representation of a radiation image using CCD sensors.

BACKGROUND OF THE INVENTION

In the field of digital radiography different methods are already known.

One such method is based upon a conventional phosphor of which the prompt-emitting light is measured directly during the X-ray irradiation using a CCD sensor. The light emitted by the fluorescent phosphor is hereby optically conducted to a CCD. One such system is described in U.S. Pat. No. 5,519,751 where a medical x-ray image processor receives the input data from a two dimensional CCD sensor which is coupled to a phosphor screen by a light conducting member. Due to the fact that a prompt emitting phosphor is used as an x-ray radiation image converting medium, detection can only be performed simultaneous with the exposure. Because the detecting area of the CCD is relatively small (15 by 15 mm), only small X-ray images can be taken at the same time. The application is therefore restricted to e.g. dental exposures. It is only possible to read-out a larger image with a CCD using a lens to image a reduced image of the emitted light onto the CCD. In this case the original image is highly reduced which results in a very low collection efficiency. Then a good signal to noise ratio can only be reached using large X-ray doses. Furthermore, the detection of the radiation image using a prompt emitting phosphor has to be performed in situ. It is not possible to read the image at another location than at the location where it is recorded and at another time than at the time at which the X-ray exposure is performed. Therefore every X-ray apparatus needs to contain a CCD and imaging optics. Due to all these factors the realisation of an x-ray system using CCDs is still very costly and impractical. An other system described in U.S. Pat. No. 4,933,558 uses a stored energy releasing phosphor plate for image detection. After being exposed to an X-ray image the phosphor is stimulated with an appropriate light source and the image recorded in the phosphor plate is readout using a CCD imager. The CCD imager is coupled to the phosphor plate using a lens or Fibre optic bundle. Although this allows the use of a phosphor plate having a size of about 7 times the size of the CCD when using tapered fibre optics, this method is restricted due to the limited size of the phosphor plate which can be used when a certain image pixel resolution is desired. In another embodiment described in U.S. Pat. No. 4,933,558 the phosphor is readout using an array of linear CCDs (each having a certain length but which are only one pixel size wide) continuously scanning the whole phosphor plate with a constant speed. With this arrangement only a small amount of pixels is readout at the same time. It is impossible to obtain a thorough readout of the fluorescent image within a acceptable time period. In U.S. Pat. No. 4,953,038 is described an other system using a stimulable phosphor plate. The sensor used for readout is a CCD sensor operated in time delay integration mode. Although a longer readout time is obtained for each pixel, the method needs a continuous scanning movement of the readout sensor so a great care has to be taken to synchronize sensor movement and readout electronics. The number of readout pixels is relatively small so readout takes a long time.

OBJECTS OF THE INVENTION

It is an object of the invention to provide a method for obtaining an electrical representation of a radiation image making use of a CCD wherein the image read-out function can be centralized and readout does not have to be performed simultaneously with the x-ray exposure. It is a further object of the invention to provide a readout method providing thorough readout of the fluorescent image while a large amount of pixels can be readout at the same time. Further objects will become apparent from the description hereafter.

SUMMARY OF THE INVENTION

To achieve the above objects, the present invention provides a method of obtaining an electrical representation of a radiation image by means of (a) CCD sensor(s) characterised by the steps of:

exposing a stimulable phosphor plate to the radiation image, thereby recording the radiation image on the phosphor plate, dividing the area of the phosphor plate into at least two different portions, stimulating each of the portions of the plate by light guided from a light source to the plate portion, the light having a wavelength within the stimulating wavelength range of the stimulable phosphor and causing the portion of the phosphor plate to emit stimulated light, Guiding the stimulated light from the phosphor plate portion to at least one two-dimensional CCD sensor kept in a static position relative to the phosphor plate portion and detecting the stimulated light by means of the CCD sensor, Converting the detected stimulated light into an electrical representation of the plate portion, Combining the electrical representation of each of the different plate portions into the electrical representation of the radiation image.

The stimulable phosphor mentioned is of the type which is capable of storing a radiation image which can be later readout by stimulating the phosphor thereby causing image-wise fluorescence of the phosphor plate during a certain decay time. Examples of such phosphors are described in european patent application EP 503 702.

It can be seen it is an advantage that by the use of the stimulable phosphor plate and the CCD, several pixels are readout at the same time and also the readout time for each pixel can be made longer so this method also enables the use of phosphors having a decay time which can lie in the range of 10 $\mu$s to 300 ms without resulting in loss of resolution. The plate portions can be sequentially stimulated by the stimulating light wherein one sensor is sequentially disposed at static positions relative to each of the portions and sequentially detects the stimulated light originating from the different portions of the phosphor plate. It is clear that the image sharpness is enhanced because the CCD sensor is kept static during image detection. Because the readout signals of different portions are combined, larger phosphor plates can be readout. The plate portions can also be simultaneously stimulated by the stimulating light where separate two-dimensional sensors are disposed at static positions relative to each of the portions and simultaneously detect the stimulated light originating from the different portions of the phosphor plate. By the use of several CCD units at the same time the overall readout time for a phosphor plate can be made shorter resulting in a higher throughput. If a higher throughput is not necessary an even larger readout time for each pixel can be used and the phosphor can be read out more deeply so that a higher sensitivity and better image quality can be reached.

It is also possible to combine both methods, wherein not all the CCD sensors are sequentially disposed facing different plate portions.

It is a further advantage that with this method the choice of light sources is not restricted to diffraction limited light sources.

The stimulating light source providing the stimulating light for stimulating the phosphor can be any lamp, such as Tungsten Halogen Lamps, Mercury Lamps, Xenon Lamps and Sodium Lamps. This light source can also be an array of LED's emitting blue (467 nm), pure green (557 nm), green (565 nm), yellow (586 nm), orange (610 nm), red (660 nm) or infrared (850 nm) light. The light source can also be a laser such as Argon-ion, Krypton, frequency doubled and non frequency doubled Nd:YAG and diode lasers. The light source does not need to be focused. Hereby strong lamps and high intensity laser-diode array's can be used. By this enhancement of the amount of energy used to stimulate the phosphor, the phosphor is read-out more deeply.

For providing a high readout efficiency it is an advantage that light guiding is done using fibre optics for guiding stimulating light from the light source to the phosphor plate portions. The fibre optic means can be a Fibre Optic Plate consisting of a great number of parallel arranged optical fibres, arranged in a coherent bundle and which are fused together to form one unit. By using optics having a high collection efficiency when detecting the stimulated light of each portion, the number of detected photons for every absorbed X-ray photon is even larger. With this method the storage phosphor can be read-out more deeply. This enhances the image quality which depends strongly on the quantum conversion efficiency. It is therefore an advantage that use is made of fibre optics for guiding emitted light from the phosphor plate portion to the CCD. This provides an even higher readout efficiency for the whole system. The input face of the fibre optic assembly is in close contact with the phosphor plate in order to obtain a sharp image.

In order to obtain a larger readout area the light guiding between the light source and the plate portion or between the plate portion and the CCD can be done by the use of tapered fibre optics, this ensures a good collection efficiency together with a larger readout area for the CCD without excessive loss in readout resolution. In a tapered fibre optic the input and output face of the optic have a different dimension so the guided input image is reduced/enlarged reproduced at the output side.

In order to provide a method for working in a reflective mode a possible embodiment comprises the use of a combined fibre optic enabling the positioning of the stimulating light source and the CCD at the same side of the phosphor plate.

By the use of combined fibre optics which are tapered, a larger area can be readout during reflection mode.

To obtain a good signal to noise ratio detection of stimulation light by the CCD has to be avoided. Therefore colour filter means have to be provided to prevent the stimulation light to reach the CCD. The colour filter means is disposed in the path between the plate and the CCD and has a certain thickness which affects the sharpness of the image. Therefore it is preferable that the colour filter is as thin as possible. A thin gelatine filter is preferred while it provides no adverse effect on the sharpness and has good filtering properties.

It is a further advantage to use doped fibres for light guiding to the CCD. This provides filtering of the guided light enabling separation of stimulation and emitted wavelength. A preferable embodiment uses a pulsed stimulating light source. This is a further advantage because this will reduce the amount of stimulating light reaching the CCD, even when filters have already been provided for blocking the stimulating light from the CCD.

In a other preferable embodiment the readout is done in time-resolving mode. A new charge build-up period in the CCD is started just after a stimulating light pulse is given to the phosphor. The detection of the stimulated light is stopped just before a further light pulse is given. Conversion of the detected light can be conducted in a later step. This time resolving method makes the readout system totally insensitive for the stimulating light, thus only the signal representing the stimulated light of the storage phosphor reaches the signal processing unit. A further important advantage using this method is that the use of optical filters for separating stimulating and stimulated wavelengths becomes obsolete. With this method readout can be done with a cheaper and simpler apparatus. An even greater advantage is that this enables the use of storage phosphors exhibiting stimulation properties where the stimulating wavelength of the phosphor is close or even within the emitted wavelength range. Although this method is very favourable when using a CCD for readout of the stimulated image because many pixels are readout at the same time, the time resolving mode can also be used in other methods known for readout of phosphor plates. In a laser scanner, usually employing a galvanometer, polygon mirror or electro-optical device for the purpose of light deflection, a light pulse is given at each pixel position when scanning the plate. Detection of the fluorescence by a light collector and photomultiplier is done in between the light pulses. The system can also be employed when using continuous scanning with CCDs to readout a phosphor plate. Here the plate is stimulated by a pulsing line of light while the CCD (e.g. with fibre-optic coupling) scans the plate in synchronised manner to detect the fluorescent image. Hereby it is possible to drive the CCD in time delay integration mode whereby the total readout time is even larger.

DETAILED DESCRIPTION OF THE INVENTION

Figure 1:
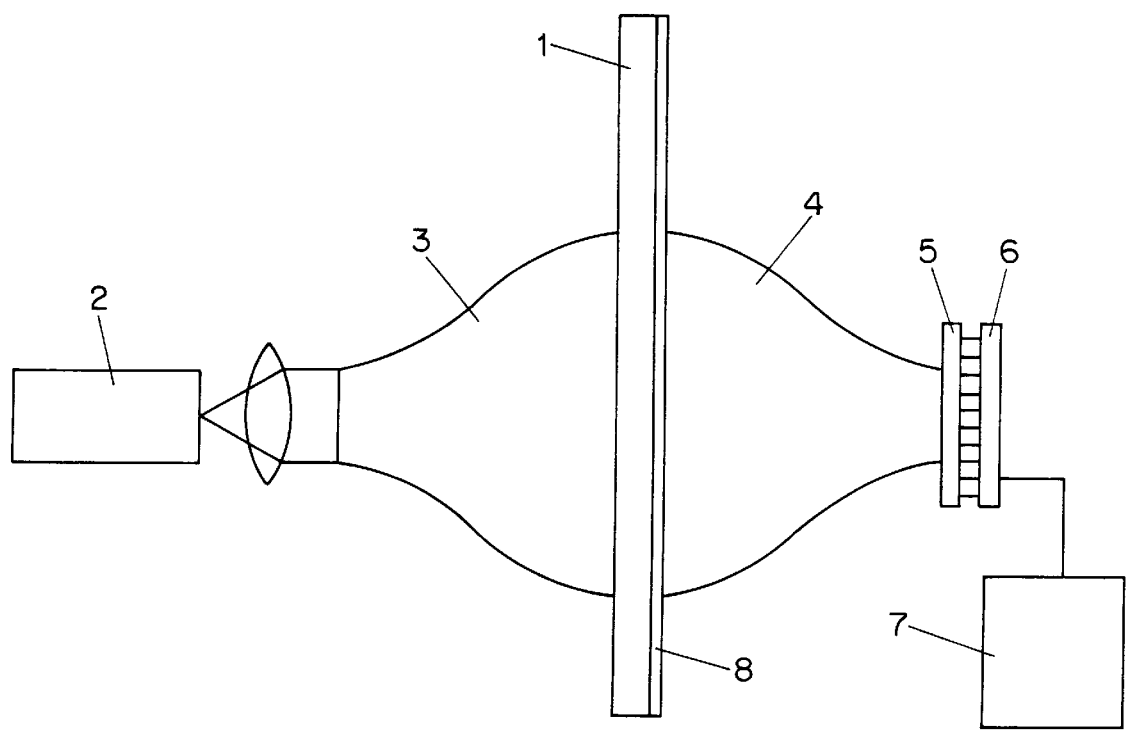
FIG. 1. shows a schematic representation of a possible embodiment of a read-out apparatus using the method comprising stimulating light source phosphor plate, CCD and optics.

FIG. 1 shows an embodiment of the readout apparatus using the method according to the invention. A stored energy releasing phosphor plate 1 comprising a $LiTaO_3:Tb^{3+}$ phosphor as described in european application EP 597 311 which is previously exposed in a x-ray apparatus (not shown) is readout in the readout apparatus. The storage phosphor plate is stimulated by a frequency doubled Nd:YAG laser (532 nm) 2.

It is clear that the used light sources are not restricted to diffraction limited light sources which is a further advantage of the system. The phosphor plate is divided in at least two different plate portions in accordance with the size of the readout arrangement. These defined portions are readout separately.

A Fibre Optic Plate 3 guiding the stimulating light to a phosphor plate portion is spreading the light of the stimulating light source. The Fibre Optic Plate is placed in direct contact with the phosphor layer 1 so that only these pixels are stimulated which will be read out. The light emitting ends of the fibre optic are evenly distributed facing the phosphor plate 1. Therefore an equal light intensity is obtained during stimulation so there is no need for shading correction of the sensed signal in the image processing section. At the other side of the phosphor plate the Fibre Optic Plate 4 is in close contact with the stimulated portion of the phosphor layer to obtain a good resolution and a good readout efficiency. The apparatus employing the method thus works in a transmittance mode, i.e. while the phosphor plate is exposed to stimulating light at one side, the detection of stimulated light is done at the opposite side. In this embodiment the Fibre Optic Plate guiding the stimulated light is tapered so that the image is reduced in size. A reduction factor of 5:1 can be obtained. The collection efficiency of the Fibre Optic Plate itself can be as high as 80%. There is virtually no loss of light between the phosphor layer and the Fibre Optic Plate and between the Fibre Optic Plate 4 and the CCD 5 because these elements are in direct contact. The collection efficiency is about factor 4 higher than in a system using a laser scanner normally used for readout of storage phosphor plates. The CCD 5 used is of a two-dimensional type. This means the photosensitive sites of the CCD form a matrix structure. In a first step the charges are accumulated in the elements wherein the charges correspond to the sensed stimulated light intensity of the portion on the phosphor plate. The readout of the charges out of the CCD can be done in a very short time. The charges are clocked out of the light sensitive area and are converted to the image signal. The CCD can also be of the type comprising a transfer buffer 6 In this CCD sensor the charges are (simultaneously) clocked into the light insensitive transfer buffer. The readout of the charges out of the buffer can be conducted in a later stadium. During this readout phase the CCD need not to be kept stationary.

By using the tapered fibre optics the total area that can be read-out simultaneously can be made larger (e.g. 50×50 mm). Several pixels are read-out simultaneously and transferring the data from the CCD to the signal processing section 7 for image processing takes only a few milliseconds. This ensures a high throughput and allows the use of a photostimulable phosphor having a decay time in the range of 1 $\mu$s to 300 ms without loss of resolution as there is no movement of the CCD relative tot the plate.

After signal acquisition of one plate portion the phosphor plate 1 and readout arrangement are relatively moved to each other so that the next portion can be read out. This can be done by moving the plate or by moving the readout optics. The stimulating light source is put off while moving the plate. A new charge build-up/readout step is started at the new plate portion after the photosensitive area of the CCD 5 has been cleared by binning the charges out of the CCD. After readout of all the plate portions the image signals are combined by the signal processing section 7. In order not to lose information at the seams of the combined image, it may be advantageous to make the irradiated portions slightly overlap. The pixels that are read out twice give the information for the computer to adjust the position of every area. The final result is an electronic representation of the stored radiation image.

a) Continuous Mode

In the method using a continuous mode the emitted light is measured during stimulation. The stimulation light of the frequency doubled Nd:YAG laser 2 is not allowed to reach the CCD and must be eliminated optically. This can be achieved by adding a coloured glass filter or a thin gelatin filter between the phosphor layer and Fibre Optic Plate. Filtering can also be done by the Fibre Optic Plate itself if doped glass fibres are used. Gelatin filters can be made very thin and therefore they can be placed between the phosphor layer and the Fibre Optic Plate without losing resolution. Also a light absorbing protective layer 8 can be added to the phosphor layer. The protective layer is only absorbing the stimulating light but has a high transmittance for the emitted light. The type of filter is chosen in function of the wavelength of the emitted light and the wavelength of the stimulating light.

b) Pulsed Mode

An alternative method uses the same readout arrangement comprising a pulsed light source. A shutter or a rotating wheel with a slit can be used to make the light source emit intermittently. The LED-array and diode laser can be pulsed directly by modulating the electric current. The Argon and Krypton lasers can also be modulated with an acousto-optic modulator. The pulse time of the frequency doubled Nd:YAG laser is preferably in the range of 1% to 30% of the decay time of the phosphor luminescence. The time between two pulses is preferably in the range of 1 to 3 times the decay time of the phosphor luminescence. The charge build-up during the stimulating light pulse is clocked out of the CCD afterwards and is not used for image detection. Immediately after this the CCD is reset and starts a new charge build-up phase to detect the stimulated light which is still present because of the decay of the phosphor. When the intensity of the emitted light becomes too small the sensed charges can be readout and a new stimulating pulse can be given whereafter a new charge detecting cycle for the same area is started. Doing so, a whole burst of stimulating pulses is given while only the charges build-up in the CCD in between the light pulses is readout. Therefore it is clear that this provides a further advantage of the invention because the phosphor can be stimulated with light having wavelengths shorter, close or equal to the wavelengths of the emitted light even if no optical filter can be found to separate them. This problem is solved by measuring the emitted light immediately after turning off the stimulation light. The charges readout between the stimulating pulses are supplied to a signal processing section where a further processing can take place. One such method is the averaging of the different signals obtained resulting in a better signal to noise ratio.

Figure 2:
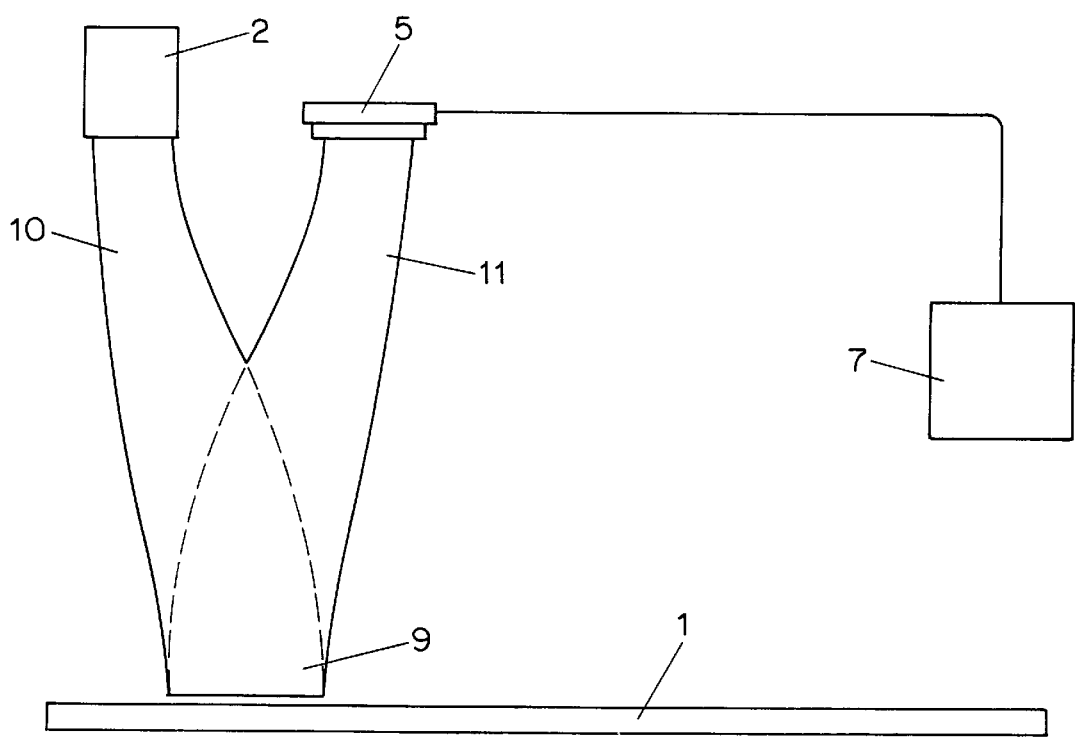
FIG. 2. shows an embodiment of a readout apparatus using the method comprising a combined input-output fibre for readout in reflection mode.

FIG. 2. represents a second embodiment using a method according to the invention wherein a combined fibre optics 9 is used for guiding the stimulation and stimulated light to and from the phosphor plate portion. In contrary to the first described embodiment where the readout operates in a transmittance mode this embodiment uses a reflectance mode, i.e. the stimulated light is detected at the same side as which the stimulating light is radiated upon the plate. The fibre optic assembly 9 comprises input fibres 10 guiding the light from the frequency doubled Nd:YAG laser 2 to the phosphor plate portion. The distribution of the input fibres 10 at the phosphor plate is made even so that an equal light distribution is ensured. The ends of the output fibres 11 pick-up the emitted stimulated fluorescence and guide this image-wise fluorescence to the CCD 5. After signal acquisition of one plate portion the readout assembly is moved relatively to the phosphor plate 1 so the next portion can be read out. The stimulating light source is switched off while moving the plate. A new acquisition/readout step is started at a plate portion after the photosensitive area of the CCD has been cleared by binning the charges out of the CCD. After performing several steps the whole phosphor plate is read out and a combined image signal representing the radiation image is obtained by the signal processing section 7.

Figure 3:
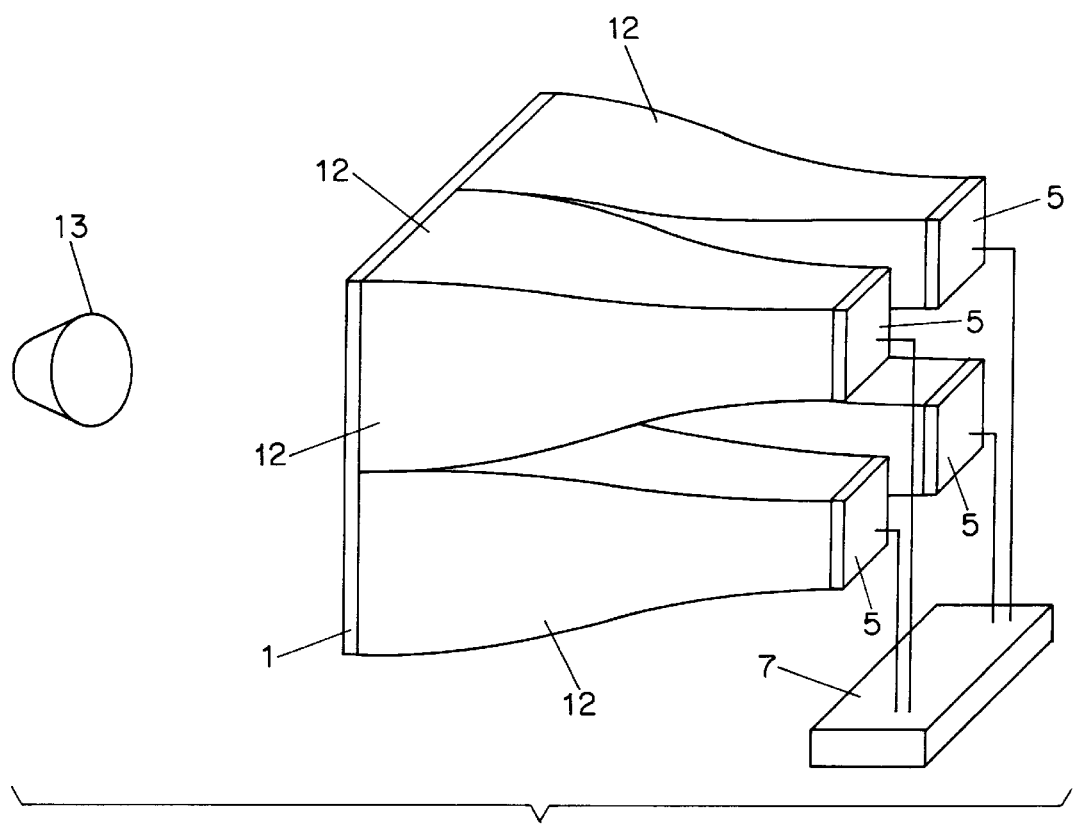
FIG. 3. shows an embodiment using the method having a matrix of ccd sensors to cover a large area.

FIG. 3. represents a third embodiment according to the present invention. Several tapered Fibre Optic Bundles 12 guiding the light from different plate portions to a CCD 5 are combined so that a complete phosphor layer 1 of 300×400 mm can be read in one time. Hereby no displacement of the CCD sensors is necessary as the array of CCDs covers the whole area of the phosphor plate. The phosphor plate is stimulated using flood lighting by a Tungsten incandescent lamp 13. All CCDs are working simultaneously so that a high throughput can be obtained. If a higher throughput is not necessary then the phosphor can be read out more deeply so that a higher sensitivity and better image quality can be reached. The signals of the different CCDs are combined in the signal processing unit 7 where a complete electronic signal representing the radiation image is put together.

We claim:

1. A method of obtaining an electrical representation of a radiation image by means of at least one CCD sensor characterised by the steps of:

exposing a stimulable phosphor plate to said radiation image, thereby recording said radiation image on said phosphor plate, dividing the area of said phosphor plate into at least two different two-dimensional portions, stimulating each of said portions of said plate by light guided from a light source to said plate portion, said light having a wavelength within the stimulating wavelength range of said stimulable phosphor and causing said portion of said phosphor plate to emit stimulated light, guiding said stimulated light from said phosphor plate portion to at least one two-dimensional CCD sensor kept in a static position relative to said phosphor plate portion and detecting said stimulated light by means of said CCD sensor, converting said detected stimulated light into an electrical representation of said plate portion, combining said electrical representation of each of said different plate portions into said electrical representation of said radiation image.

2. Method according to claim 1 wherein said plate portions are sequentially stimulated by said stimulating light wherein one sensor is sequentially disposed at static positions relative to each of said portions and sequentially detects said stimulated light originating from said different portions of said phosphor plate.

3. Method according to claim 1 wherein said plate portions are simultaneously stimulated by said stimulating light where separate two dimensional sensors are disposed at static positions relative to each of said portions and simultaneously detect said stimulated light originating from said different portions of said phosphor plate.

4. A method according to claim 1, wherein said guiding of said stimulating light is done by use of fibre-optic means conducting said stimulating light from said stimulating light source to said storage phosphor plate.

5. A method according to claim 4, wherein said light guiding is done by use of a tapered fibre-optic means.

6. A method according to claim 1, wherein said guiding of said stimulated light is done by fibre-optic means conducting said emitted light from said storage phosphor plate to said CCD.

7. A method according to claim 6, wherein said light guiding is done by use of a tapered fibre-optic means.

8. A method according to claim 1, wherein said light guiding for said stimulation light and said light guiding of said stimulated light to said CCD is done by using a combined fibre-optic means, directing said stimulating light from said stimulating light source to said storage phosphor plate and guiding said emitted light from said storage phosphor plate to said CCD wherein the output end of the fibres guiding said stimulation light and the input end of the fibres guiding said stimulated light are situated at the same side of said storage plate.

9. A method according to claim 8, wherein said light guiding is done using a combined fibre-optic means which comprises at least one tapered fibre optic.

10. A method according to claim 1, wherein said light guiding from said phosphor plate to said CCD is done using fibre-optic means in combination with a thin gelatin filter as filtering means for the stimulated light.

11. A method according to claim 1, wherein said light guiding from said phosphor plate to said CCD is done using fibre-optic means comprising doped glass fibres as a filtering means.

12. A method according to claim 1, wherein said stimulation of said phosphor plate is done by a stimulating light source which is pulsed.

13. A method according to claim 12, wherein detection of stimulated light is done in between the stimulating light pulses from said stimulating light source.

* * * * *